No. 709,412. Patented Sept. 16, 1902.
E. KEMPSHALL.
PLAYING BALL.
(Application filed July 5, 1902.)
(No Model.)
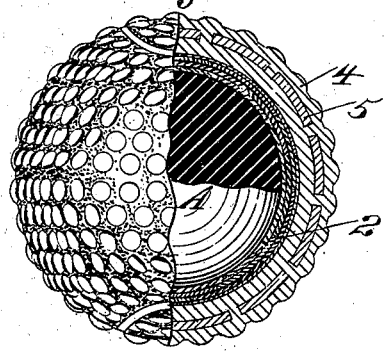
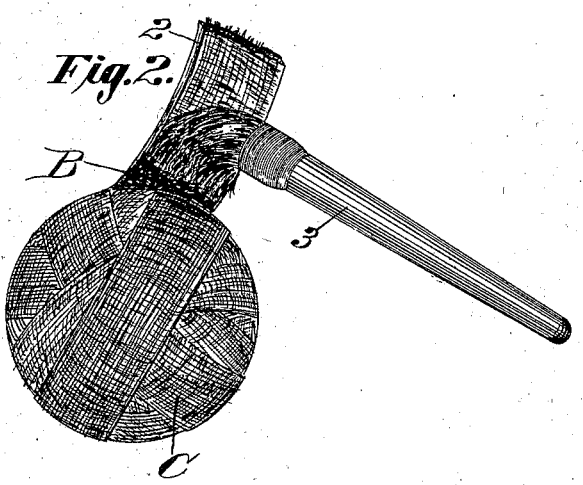
Witnesses:
Herbert J. Smith
F. E. Maynard
Inventor:
Eleazer Kempshall,
By his Attorney,
J. H. Richards.

UNITED STATES PATENT OFFICE.

ELEAZER KEMPSHALL, OF BOSTON, MASSACHUSETTS.

PLAYING-BALL.

SPECIFICATION forming part of Letters Patent No. 709,412, dated September 16, 1902.

Application filed July 5, 1902. Serial No. 114,438. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Playing-Balls, of which the following is a specification.

This invention relates to playing-balls such as used in golf and other games; and its objects are to improve their quality, efficiency, and durability.

In the drawings forming part of this specification, Figure 1 is a view of the completed ball, partly broken away to show its construction; and Fig. 2 is a view illustrating the manner of winding the core.

Upon a center piece A of suitable material—such, for instance, as soft rubber—I wind elastic belting 2, layer over layer, in miscellaneous directions under high tension. Previous to or during the process of winding the elastic belting I apply to the under side thereof a coating of cement B, preferably a solution of celluloid, so that the layers become cemented one upon another. The cement B may be applied by a brush 3 or otherwise. Upon the core C thus formed I apply a shell 4, of plastic material, preferably celluloid, in which is embedded a perforated shell 5, of metal or other suitable material, and the whole is compressed between suitable heating and finishing dies, the shell preferably holding the core under high compression. The metal layer 5 prevents cracking of the celluloid, and one advantage gained by the use of celluloid as a cement is that it unites with the celluloid shell and itself forms a stiff resilient layer.

In the present instance the elastic belting consists of a strip of suitable width of rubber threads having a woven-fabric casing; but other forms of elastic bands or belting—such, for instance, as pure rubber—may be used without departing from the spirit of this invention. In case pure rubber is used, however, rubber cement may be substituted for celluloid solution.

Having described my invention, I claim—

1. A playing-ball comprising a core made up partially of windings of elastic belting, said elastic belting being cemented together with celluloid cement, and a shell of celluloid holding said core under compression.

2. A playing-ball comprising a yielding core, windings of elastic belting miscellaneously applied to said core, said belting being cemented together, and a shell consisting of plastic material and metal holding said core under compression.

3. A playing-ball comprising a rubber core, elastic belting wound thereon in different directions, celluloid cement holding layer upon layer, and a shell of celluloid and metal holding said core under compression.

4. A playing-ball comprising a rubber core, elastic belting wound thereon in different directions, said belting being faced with celluloid cement and adhering one layer to another, and a shell composed of layers of plastic material and metal holding said core under compression.

5. A playing-ball comprising a rubber core, elastic belting wound thereon in different directions, said belting being faced with celluloid cement and adhering one layer to another, a shell comprising layers of celluloid, and a hard perforated material holding said core under compression.

ELEAZER KEMPSHALL.

Witnesses:
B. C. STICKNEY,
JOHN O. SEIFERT.